C. F. HAMMON.
SAFETY RAZOR.
APPLICATION FILED JAN. 20, 1920.
1,344,447.
Patented June 22, 1920.
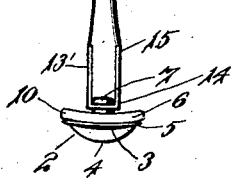
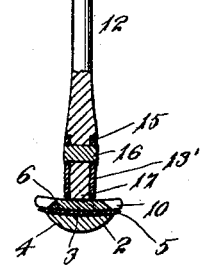
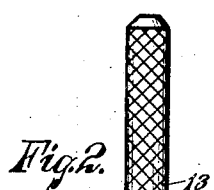
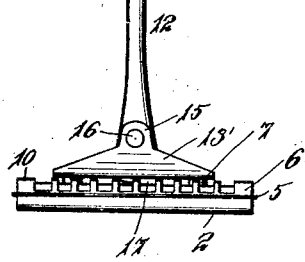
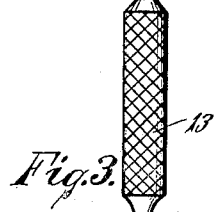
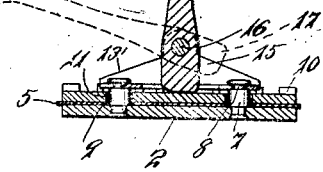
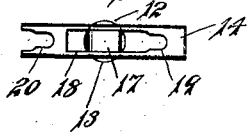
Inventor
Carl F. Hammon
By
Atty

UNITED STATES PATENT OFFICE.

CARL F. HAMMON, OF HARTFORD, CONNECTICUT.

SAFETY-RAZOR.

1,344,447.	Specification of Letters Patent.	Patented June 22, 1920.

Application filed January 20, 1920. Serial No. 352,681.

*To all whom it may concern:*

Be it known that I, CARL F. HAMMON, a citizen of the United States, residing at Hartford, in the county of Hartford and State of Connecticut, have invented certain new and useful Improvements in Safety-Razors, of which the following is a specification.

This invention relates to safety razors the object of the invention being the provision of a simple and effective article of the character set forth by which the blade is held solidly and substantially in position and yet which can be easily and quickly removed when occasion therefor is required.

In the drawings accompanying and forming a part of the present specification, I have shown in detail one form of embodiment of the invention which to enable those skilled in the art to practise the same will set forth fully in the following description. I am not restricted to this disclosure. I may depart therefrom in several respects within the scope of the invention defined by the claims following said description.

Referring to said drawings:

Figure 1 is an elevation of a safety razor involving the invention, the parts being shown as separated.

Fig. 2 is a side view of the same, with the parts assembled in operative condition.

Fig. 3 is a view corresponding somewhat to Fig. 2 with the lower portion in section, the handle being shown in a shifted position by dotted lines.

Fig. 4 is a side view, as seen from the left for instance in Fig. 2.

Fig. 5 is a view as seen for instance from the left in Fig. 2 with the lower portion of the instrument in section, and Fig. 6 is a bottom plan view of a supporting member.

Like characters refer to like parts throughout the several views.

The razor involves in its makeup, a suitable blade supporting member such as that denoted by 2. This blade supporting member is usually channeled as at 3 on its upper side and is correspondingly bowed or rounded transversely as at 4 on its underside although it is conceivable that the blade supporting member might be of some other shape. As a matter of fact the invention involves certain broad relations. The blade which is generally used is designated by 5. As customary it is of rectangular form and is usually resilient, bendable or springy which condition can best be obtained by making it comparatively thin. Its opposite sides are knifed or razor edged so that the blade thus becomes duplex.

Associated with the blade supporting or main member 2 is a suitable clamping member which is set into active or blade-holding relation as I will hereinafter explain. The part 6 answers satisfactorily in this connection.

The main or blade supporting member as shown has the longitudinally separated studs or pins 7 having near their upper or outer ends the annular channels or grooves 8. The blade 5 has holes or perforations 9 to receive the two studs, the blade when in position fitting substantially against the channeled surface 3 of the support so that the blade may be flexed as I will later set forth.

The clamping member 6 is transversely arched so that the under surface will be of bowed or rounded formation the upper or outer surface being correspondingly channeled or guttered. The lateral portions of the clamping member 6 are toothed as at 10 to form the two lateral guards which are not uncommon in safety razors. The clamping member 6 also has holes or perforations 11 to receive the two studs or pins 7 when the parts are assembled. It will be understood that when the parts are in working relation, the blade 5 is superimposed upon the main or supporting member 2 and that the clamping member 6 is superimposed upon the blade, the clamping member being set or unset also as I will hereinafter describe.

The handle is denoted in a general way by 12 its handle or grasping portion 13 being milled or roughened to insure the necessary grip being obtained thereupon. The handle 12 is associated with a supporting member as 13 the body 14 of which is slotted as I will later set forth. The handle supporting member 13 is furnished with side flanges 15 between which the handle is pivoted as at 16. The pivot extends through the shank of the handle 17 disposed in the slot 18 which has a branch 19 leading from an end thereof. The body 14 of the supporting member has at its opposite end the open ended slot 20 the inner portion of which is narrow to conform to the width practically of the branch 19.

The parts are shown entirely separated in Fig. 1. To assemble them the following procedure will be adopted: The studs or projections 7 are extended through the perforations or holes 9 in the blade 5 and the latter then fitted against the blade supporting member 2. The two studs are then passed through the holes or perforations 11 of the clamping member 10 and the three parts are then relatively brought solidly together if necessary, by pressure of the fingers. The handle 12 is then tipped for instance to the dotted line position in Fig. 3 and the stud 7 at the right is slipped into the open ended slot 20 and at the same time the stud at the left is slipped in the main portion of the slot 18 the supporting member at this time being firm against the clamping member 6. The supporting member 13 is then thrust to the right in Fig. 1 and Fig. 3 for that matter, so that the stud 7 at the right will bottom in the narrow portion of the open ended slot 20 and the stud 7 at the left will bottom in the narrow branch 19 of the slot 17, the walls of the two slots fitting in the annular groove 8 and the heads of the studs 7 (constituting suitable stop means), overlying the bottom or body of the supporting member 13. This assembles the parts. The handle 12 is now brought to upright position which is easily accomplished and the active surface of the cam 16 extending through the slot 17 will flex or bend the clamping member 6 and thus cause it to tightly similarly flex and clamp the blade 5 against the blade supporting member 2.

What I claim is:

1. A safety razor comprising a blade-supporting member having longitudinally-separated headed studs, a blade-clamping member perforated to receive the respective studs, a handle, and a supporting member to which the handle is jointed, the handle-supporting member being slotted to receive the studs and having a cam to press against the clamping member to cause the same to clamp the blade against the blade-supporting member and at the same time to force the handle-supporting member against the heads of the studs.

2. A safety razor comprising a blade-supporting member having longitudinally separated studs, a blade clamping member, having openings to receive the respective studs, a handle, and a handle-supporting member to which the handle is jointed, the handle-supporting member also having openings to receive the studs and having a cam to press against the clamping member to cause the same to clamp the blade against the blade-supporting member and at the same time to force the handle-supporting member against fixed portions of the respective studs.

3. A safety razor comprising a blade-supporting member having longitudinally-separated studs, a flexible blade on said blade-supporting member, a blade-clamping member having openings to receive the respective studs, a handle and a handle-supporting member to which the handle is jointed, the handle-supporting member also having openings to receive its studs and having a cam to press against the clamping member to cause the same to flex the blade into clamping engagement with the blade-supporting member and at the same time to force the handle-supporting member against fixed portions of the respective studs.

4. A safety razor comprising a blade-supporting member having longitudinally-separated studs, a blade-clamping member having openings to receive the respective studs, a handle, and a handle-supporting member to which the handle is jointed, the handle-supporting member also having openings to receive the studs, the handle having means to press against the clamping member to cause the same to clamp the blade against the blade-supporting member and at the same time to force the handle-supporting member against fixed portions of the respective studs.

5. A safety razor comprising a blade-supporting member having projecting means, a blade-clamping member through which the projecting means extends, a handle, and a handle-supporting member to which the handle is jointed, the handle-supporting member also receiving said projecting means, and the handle having means to act against the clamping member to cause the same to clamp a blade against the blade-supporting member and at the same time to force the handle-supporting member solidly against said projecting means.

6. A safety razor comprising a blade-supporting member having longitudinally-separated studs, a blade-clamping member perforated to receive the respective studs, a handle, and a handle-supporting member to which the handle is jointed, the body of the handle-supporting member having an elongated slot provided with a narrow extension, and said body having a second slot having a narrow portion both narrow portions of which fit around the respective studs, the handle having a cam acting to press against the clamping member to cause the same to clamp the blade against the blade-supporting member and at the same time to force the supporting member against the heads of the studs.

In testimony whereof I affix my signature in the presence of two witnesses.

CARL F. HAMMON.

Witnesses:
HEATH SUTHERLAND,
CHAS. YAUCH.